United States Patent

Shower et al.

[11] Patent Number: 5,555,708
[45] Date of Patent: Sep. 17, 1996

[54] PRESSURE CLOSING MECHANISM

[75] Inventors: Michael F. Shower, Waterford; Kenneth P. McDonald, Wixom; Anthony J. Lukasiewicz, Howell, all of Mich.

[73] Assignee: Elopak Systems A.G., Glattbrugg, Switzerland

[21] Appl. No.: 426,105

[22] Filed: Apr. 21, 1995

[51] Int. Cl.$^6$ .................................................. B65B 1/02
[52] U.S. Cl. ........................... 53/563; 53/377.3; 53/565; 493/141; 493/164
[58] Field of Search ........................ 53/565, 563, 377.3, 53/387.4, 136.1, 136.2; 493/141, 142, 143, 164

[56] References Cited

U.S. PATENT DOCUMENTS

| | | | |
|---|---|---|---|
| 2,634,773 | 4/1953 | Weyant | 144/281 |
| 3,207,049 | 9/1965 | Monroe et al. | 493/164 |
| 3,555,975 | 1/1971 | Barnes | 53/375 |
| 3,619,979 | 11/1971 | Martensson et al. | 53/375 |
| 3,699,743 | 10/1972 | King et al. | 53/186 |
| 3,788,033 | 1/1974 | Martensson et al. | 53/565 |
| 3,992,850 | 11/1976 | Vetter | 53/112 R |
| 4,038,908 | 9/1977 | Kauffman | 93/36.3 |
| 4,167,092 | 9/1979 | Medwed | 53/373 |
| 4,193,341 | 3/1980 | Clements et al. | 100/93 P |
| 4,259,765 | 4/1981 | Trutzschler | 19/88 R |
| 4,528,803 | 7/1985 | Ott | 493/164 |
| 4,735,031 | 4/1988 | Langen | 53/122 |
| 4,759,171 | 7/1988 | Bruveris et al. | 53/565 |
| 4,986,058 | 1/1991 | Carlsson et al. | 53/565 |
| 5,085,029 | 2/1992 | Esper | 53/374.8 |

FOREIGN PATENT DOCUMENTS

| | | | |
|---|---|---|---|
| 2838862 | 3/1979 | Germany | 53/136.2 |
| 8501013 | 3/1985 | United Kingdom. | |

*Primary Examiner*—John Sipos
*Assistant Examiner*—Ed Tolan
*Attorney, Agent, or Firm*—Reising, Ethington, Barnard & Perry

[57] ABSTRACT

A pressure sealing mechanism having a yoke into which a mandrel is positioned while having a carton tube mounted thereon with overlapped end closure panels, the yoke including side walls, a closed outer end wall, oppositely disposed, inwardly extending flanges formed on the inner ends of the side walls, with cooperating slots formed in the mandrel, and an expansible bladder and a pressure pad mounted in the yoke for sealing the panels upon expansion of the bladder by forcing the yoke radially outwardly such that the flanges engage the slots providing a compressive force on the panels.

11 Claims, 2 Drawing Sheets

PRESSURE CLOSING MECHANISM

TECHNICAL FIELD

This invention relates generally to closing mechanisms and, more particularly, to a pressure closing mechanism for use on a turret of a liquid-carrying, thermoplastic coated carton forming, filling and sealing machine.

BACKGROUND ART

Expandable sealers are disclosed in U.S. Pat. Nos. 5,085,029; 4,735,031; 4,259,765; 4,193,341; 4,167,092; 3,992,850; and 2,634,773. A typical carton sealing press plate arrangement is disclosed in U.S. Pat. No. 3,699,743.

DISCLOSURE OF THE INVENTION

A general object of the invention is to provide an improved tube and closing mechanism, in which the closing consists of final folding and/or sealing of the end closure, in particular an improved carton bottom sealing mechanism for use on a forming, filling and sealing machine.

Another object of the invention is to provide a tube end closing mechanism in which tie means extending between end-pressing means, on the one hand, and tube-supporting means, such as a mandrel or mandrel support, on the other hand, acts to take up the reaction forces of the pressing of the tube end onto the mandrel.

A further object of the invention is to provide a tube end closing mechanism in which end-pressing means is simplified.

A yet further object of the invention is to proving a sealing mechanism having a yoke into which a mandrel is positioned while having a carton tube mounted thereon with overlapped end closure panels, the yoke including side walls, a closed outer end wall, oppositely disposed, inwardly extending flanges formed on the inner ends of the side walls, with co-operating slots formed in the mandrel, and an expansible bladder and a pressure pad mounted in the yoke for sealing the panels upon expansion of the bladder, by forcing the yoke radially outwardly such that the flanges engage walls of the slots, providing a compressive force on the panels.

These and other objects and advantages of the invention will become more apparent when reference is made to the following description and accompanying drawings.

BEST MODE OF CARRYING OUT THE INVENTION

Figure 1:
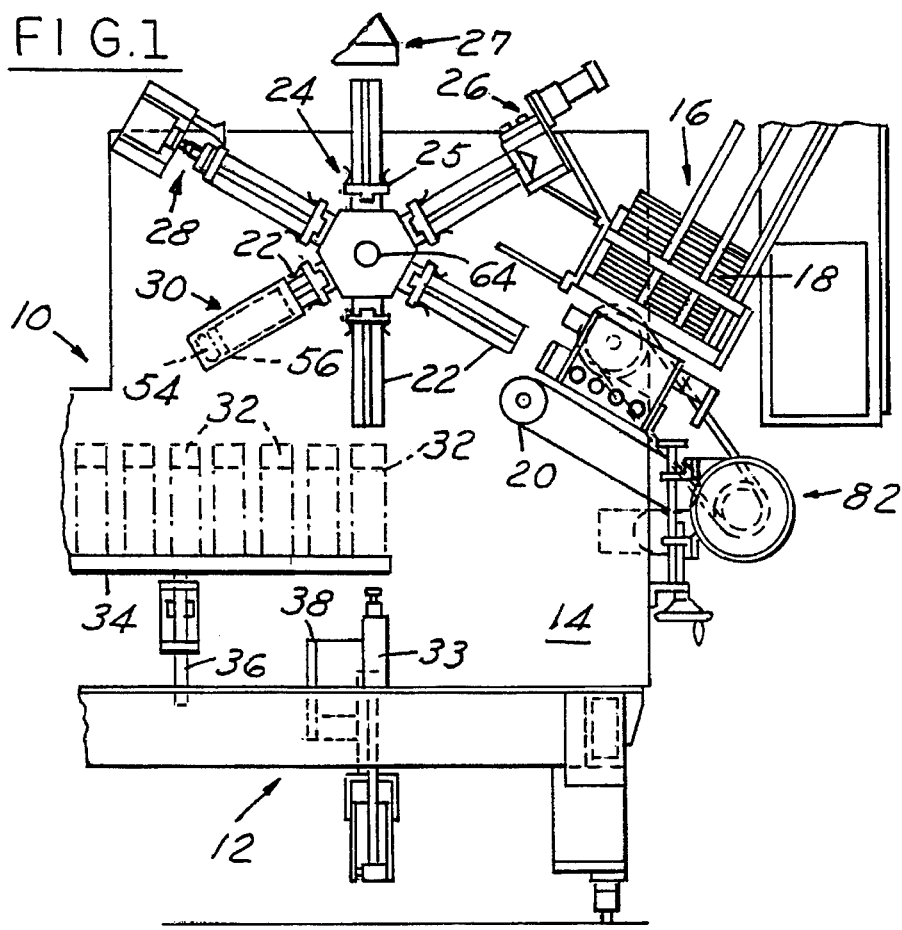
FIG. 1 is a fragmentary side elevational view of a machine embodying the invention.
Figure 2:
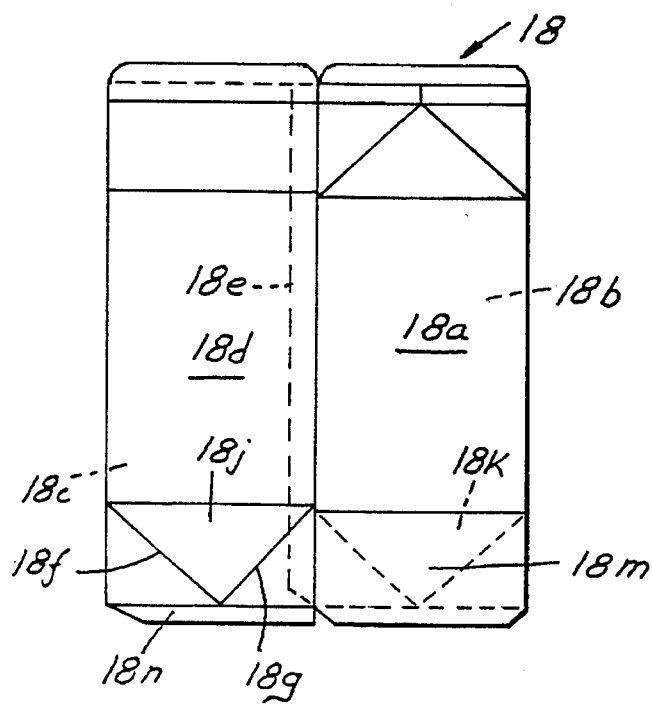
FIG. 2 is a layout view of a carton blank after it has been folded from a flat blank and side seamed into a four-sided flat structure suitable for being further formed into a four-sided tube and bottom sealed by the FIG. 1 machine embodying the invention.
Figure 3:
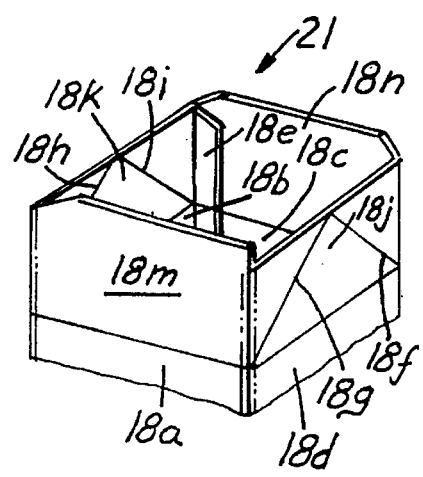
FIG. 3 is a fragmentary perspective view of the bottom closure panels of a four-sided tube into which the flat, side-seam-sealed blank of FIG. 1 is opened, illustrating particularly the bottom end panels to be sealed by the invention.

Referring now to the drawings in greater detail, FIG. 1 illustrates a forming, filling and sealing machine 10 of the liquid packaging type, including frame means comprised of a base 12 and a vertical support keel 14 mounted along the longitudinal axis of the base 12. The loading, forming, filling and sealing components are mounted on one side of the keel 14 as follows:

A magazine 16 for holding a plurality of paperboard blanks 18 is mounted on the one side of one end of the keel. The blanks 18 are illustrated in FIG. 2 as having four full width side panels 18a, 18b, 18c and 18d, and a side seam flap 18e, with the panels 18b and 18c being folded behind the panels 18a and 18d, respectively, and the flap 18e sealed to the inner edge portion of the panel 18c. A loading mechanism 20 is mounted on the keel just below the magazine 16 and adapted to withdraw one blank 18 at a time from the magazine 16 while opening same into a four-sided tube 21 (FIG. 3), and then to load such individual tube onto one of six mandrels 22 of an indexable turret mechanism 24. The latter is rotatably mounted on an upper portion of the keel 14. The receiving mandrel is positioned at 4:00 o'clock when a paperboard tube 21 is slid thereon by the loading mechanism 20. An adjustable stop member 25 is operatively connected to each mandrel 22 to accommodate the forming of carton bottom closures of cartons having the same cross-section but different heights.

The mandrel indexes counterclockwise in FIG. 1 to a 2:00 o'clock position where two panels 18j and 18k of the usual four bottom closure panels 18j; 18k, 18m and 18n of the tube 21 are pre-broken along preformed score lines 18f and 18g, and 18h and 18i (FIG. 3) by a prebreaker unit 26. At the 12:00 o'clock position, the four bottom closure panels of the tube 21 are heated by a suitable heater 27 mounted on the keel 14 so as to extend above the 12:00 o'clock mandrel position. The bottom heated tube 21 and the mandrel 22 are next indexed to a 10:00 o'clock position where a folding unit 28 folds the bottom panels into an overlapped substantially flat configuration. Thereafter, the mandrel 22 bearing the tube 21 is indexed to an 8:00 o'clock position, where it enters a sealing mechanism 30. As will be explained, the mechanism 30 applies pressure against, and seals, the overlapped panels together, changing the tube 21 into a bottom sealed container or carton 32 suitable for containing a liquid. Thereafter the bottom sealed carton is indexed to an unloading 6:00 o'clock position.

At the latter position, the carton is stripped from the mandrel 22 by a stripping unit, represented as 33, and pulled downwardly to rest on an endless conveyor 34. As may be noted in FIG. 1, the stripping unit 33 is mounted on the keel 14, supported thereon by a bracket 38. As the conveyor 34 indexes leftward in FIG. 1, the rotation of the turret mechanism 24 is coordinated with the movement of the conveyor so as to continuously supply bottom sealed cartons 32 at regular intervals to the conveyor.

With the carton 32 thus seated on the conveyor 34, it is in position to be transferred through the usual stations (not shown) for pre-breaking, filling, folding and sealing the top closure panels of a thermoplastic-coated, liquid carrying carton.

Figure 4:
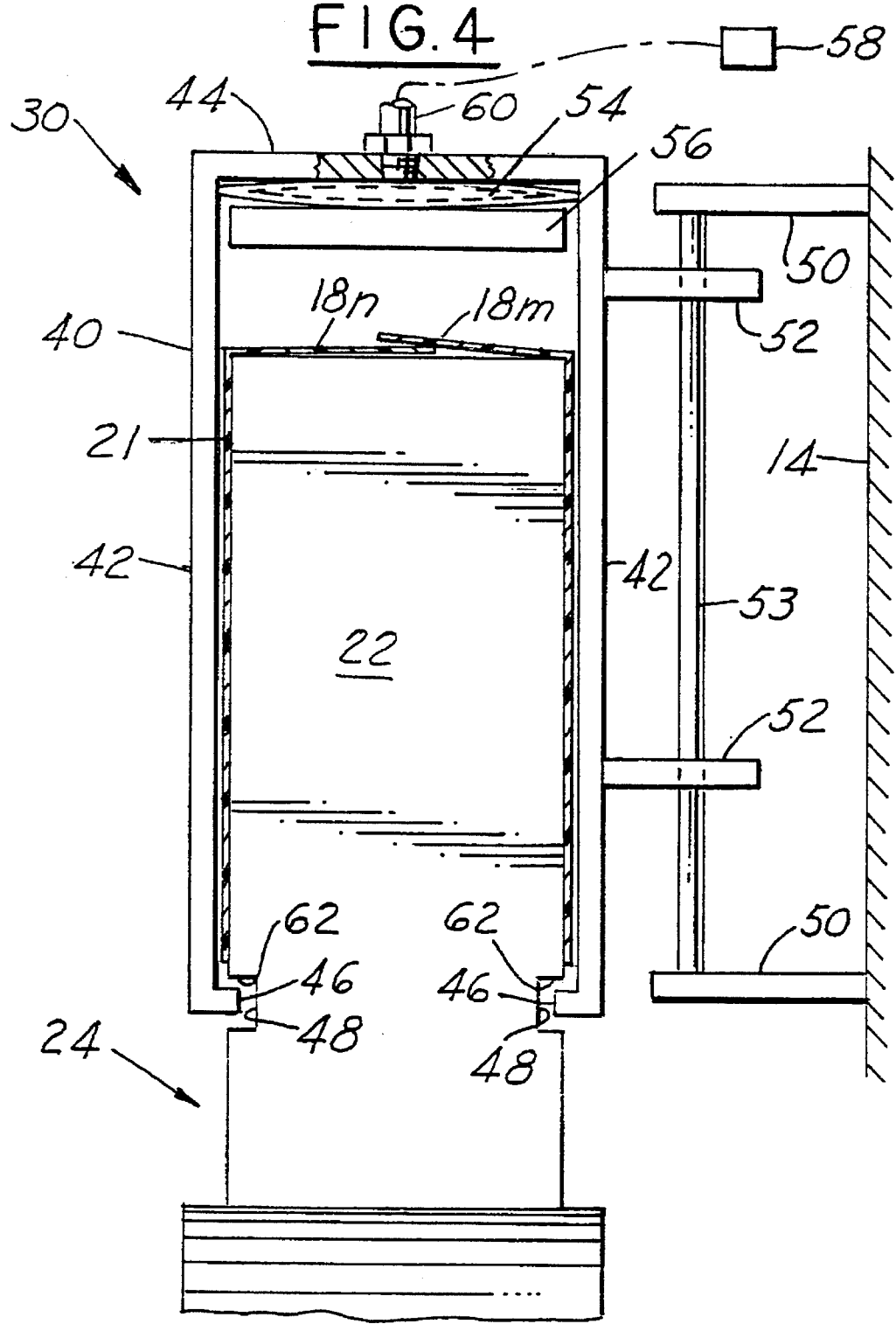
FIG. 4 is an enlarged, sectional, elevational view of the invention embodied in the FIG. 1 structure, and having the four-sided tube mounted thereon with the bottom end panels of FIG. 3 folded prior to being sealed.

Referring now to FIG. 4, the sealing mechanism 30 includes tie means comprised of a yoke 40 into which each mandrel 22 and its associated tube 21 indexes. As shown, the yoke 40 has open inlet and outlet sides in the path of the mandrels 22, and two oppositely disposed closed side walls 42 and an outer closed end wall 44. Inwardly extending, arcuate shaped flanges 46 are formed on the inner edges of the side walls 42.

Oppositely disposed, arcuate shaped slots 48 are formed in the sides of each mandrel 22 to accommodate the entry of each mandrel into the framework 40. Suitable brackets 50 serve to fix a bar 53 to the keel 14, parallel to the plane of the path of the mandrels 22, while suitable brackets 52 are slidably mounted on the bar 53 and are fixed to the yoke 40, to permit a predetermined radial movement of the yoke 40, for a purpose to be explained.

An expansible bladder 54 is secured at its upper surface (in FIG. 4), in any suitable manner, such as by gluing, to the inner surface of the end wall 44. A pressure pad 56 having face dimensions substantially matching the cross-section of the sleeve 21, and of a predetermined thickness is secured in any suitable manner at its upper surface (in FIG. 4) to the adjacent surface of the expansible bladder 54, while its lower surface is positioned adjacent the overlapped end panels 18*j*, 18*k*, 18*m*, and 18*n* of the sleeve 21.

A source of fluid under pressure, represented at 58, is operatively connected via a line 60 to the expandable bladder 54.

In operation, once the tube covered mandrel 22 enters the yoke 40 and dwells therein, fluid from the source 58 is timed to enter the bladder 54 to expand same. This forces the pressure pad 56 into engagement against the previously heated and folded and overlapping panels 18*j*, 18*k*, 18*m* and 18*n* of the tube 21, to pressure seal same together between the pad 56 and the end face of the mandrel 22.

More specifically, the bladder 54 expands to the point where the flanges 46 are caused to be lifted upwardly (in FIG. 4) against the radially outermost surfaces 62 of the slots 48, with no radially inwardly directed force along the mandrel 22 to the hub of the turret mechanism 24 and its supporting shaft, represented as 64 in FIG. 1.

INDUSTRIAL APPLICABILITY

As described, it is apparent that no axial force is exerted by the pressing means 54, 56 through the mandrels 22 to the hub of the turret mechanism 24 and, hence, into the shaft 64 on which the turret mechanism is mounted. This eliminates a load on the shaft and its associated bearings, permitting a smaller and lighter mechanism, with a longer life span.

While but one embodiment of the invention has been shown and described, other modifications thereof are possible within the scope of the following claims.

What is claimed is:

1. A carton tube closing device including in combination, frame means, supporting means including a mandrel and movably mounted upon said frame means, said mandrel serving to receive over an end thereof a carton tube whereof an end projecting beyond said end of said mandrel is to be closed, driving means serving to move said supporting means relative to said frame means, and pressing means disposed beyond said end of said mandrel and serving to act substantially axially of said mandrel to close said end of said tube, wherein the improvement comprises tie means additional to said frame means, extending from said pressing means to said supporting means and retaining said pressing means relative to said supporting means against reaction forces extending substantially axially of said mandrel and produced by the pressing action of the pressing means, wherein said tie means comprises a yoke comprised of an end member and two oppositely disposed lateral members arranged to receive said mandrel therebetween, said pressing means being mounted in said yoke adjacent said end member and arranged to act between said end member and end parts of said carton tube to close the same, following entry of said mandrel through an open side of said yoke, wherein said yoke further comprises two inward protrusions extending towards each other from zones of the two lateral members and said supporting means further comprises two shoulders at respective opposite lateral sides of said mandrel and upon which the respective inward protrusions come to bear under said reaction forces.

2. A combination according to claim 1, wherein said shoulders constitute side walls of respective slots formed in said mandrel and extending transversely thereof.

3. A combination according to claim 1, and further comprising a source of fluid under pressure, said pressing means being connected to said source and expandable by said fluid under pressure.

4. A combination according to claim 1, and further comprising a source of fluid under pressure, said pressing means being connected to said source and expandable by said fluid under pressure, said pressing means comprising an expansible bladder secured to said end member, and a pressure pad secured to said bladder for bearing upon said end parts of said tube.

5. A combination according to claim 1, wherein said supporting means comprises a rotary spider including a plurality of radially extending mandrels including said mandrel, said spider being so arranged that said mandrels in turn pass said pressing means and said tie means.

6. A combination according to claim 5, wherein said driving means serves to rotate said spider in an indexing manner.

7. A combination according to claim 1, wherein said tie means is slidably mounted upon a bar fixed to said frame means.

8. A carton tube closing device including in combination, frame means, supporting means comprising a mandrel and movably mounted upon said frame means, said mandrel serving to receive over an end thereof a carton tube whereof an end projecting beyond said end of said mandrel is to be closed, said mandrel having slots formed in opposite sides thereof, driving means serving to move said supporting means relative to said frame means, and pressing means disposed by said end of said mandrel and serving to act substantially axially of said mandrel to close said end of said tube, wherein the improvement comprises said pressing means comprising an inflatable bladder serving as the only driving element of the pressing means for closing said tube end, said pressing means mounted in a yoke adapted to receive said mandrel, said yoke having inwardly extending flanges formed thereon for cooperation with said slots upon inflation of said bladder to prevent radially inward directed force along the mandrel.

9. A combination according to claim 8, wherein said pressing means further comprises a pressure pad secured to said bladder for bearing upon said end of said tube.

10. A combination according to claim 8, wherein said supporting means comprises a rotary spider including a plurality of radially extending mandrels including said mandrel, said spider being so arranged that said mandrels in turn pass said pressing means and said tie means.

11. A combination according to claim 10, wherein said driving means serves to rotate said spider in an indexing manner.

* * * * *

UNITED STATES PATENT AND TRADEMARK OFFICE
CERTIFICATE OF CORRECTION

PATENT NO. : 5,555,708
DATED : September 17, 1996
INVENTOR(S) : Michael F. Showler, Kenneth P. McDonald, Anthony J. Lukasiewicz It is certified that error appears in the above-identified patent and that said Letters Patent is hereby corrected as shown below:

Title page, item: [75] Inventors: delete "Shower", and substitute --Showler--.

Signed and Sealed this

Twenty-fourth Day of June, 1997

Attest:

Attesting Officer

BRUCE LEHMAN
Commissioner of Patents and Trademarks